United States Patent
Kadiri et al.

(10) Patent No.: US 10,776,700 B2
(45) Date of Patent: Sep. 15, 2020

(54) METHOD AND SYSTEM FOR AUTOMATIC RESOLUTION OF USER QUERIES

(71) Applicant: Senseforth, Inc., Palo Alto, CA (US)

(72) Inventors: Krishna Kadiri, Bangalore (IN); Shridhar Marri, Bangalore (IN); Ritesh Radhakrishnan, Bangalore (IN); Suryaprakash CV, Bangalore (IN); Tousif Khazi, Bangalore (IN)

(73) Assignee: Senseforth, Inc., Palo Alto, CA (US)

( * ) Notice: Subject to any disclaimer, the term of this patent is extended or adjusted under 35 U.S.C. 154(b) by 835 days.

(21) Appl. No.: 15/261,685

(22) Filed: Sep. 9, 2016

(65) Prior Publication Data

US 2017/0075988 A1 Mar. 16, 2017

(30) Foreign Application Priority Data

Sep. 10, 2015 (IN) .......................... 4807/CHE/2015

(51) Int. Cl.
*G06F 16/00* (2019.01)
*G06N 5/02* (2006.01)
*G06F 16/332* (2019.01)

(52) U.S. Cl.
CPC ........... *G06N 5/02* (2013.01); *G06F 16/3329* (2019.01)

(58) Field of Classification Search
CPC .............................. G06F 16/3329; G06N 5/02
USPC ........................................... 701/769; 707/769
See application file for complete search history.

(56) References Cited

U.S. PATENT DOCUMENTS

| | | | | |
|---|---|---|---|---|
| 9,633,004 | B2* | 4/2017 | Giuli | G06F 16/3329 |
| 10,019,512 | B2* | 7/2018 | Boyle | G06F 17/2785 |
| 2002/0178228 | A1* | 11/2002 | Goldberg | G06Q 10/107 |
| | | | | 709/206 |
| 2008/0163107 | A1* | 7/2008 | Haug | G06F 16/332 |
| | | | | 715/804 |
| 2011/0106617 | A1* | 5/2011 | Cooper | G06Q 30/02 |
| | | | | 705/14.49 |
| 2012/0303356 | A1* | 11/2012 | Boyle | G06F 17/2785 |
| | | | | 704/9 |
| 2014/0172899 | A1* | 6/2014 | Hakkani-Tur | G06N 7/005 |
| | | | | 707/759 |
| 2014/0379615 | A1* | 12/2014 | Brigham | G06N 20/00 |
| | | | | 706/11 |
| 2015/0066479 | A1* | 3/2015 | Pasupalak | G06F 17/27 |
| | | | | 704/9 |
| 2015/0286747 | A1* | 10/2015 | Anastasakos | G06F 16/9017 |
| | | | | 707/776 |

(Continued)

*Primary Examiner* — Shiow-Jy Fan
(74) *Attorney, Agent, or Firm* — Hamre Schumann, Mueller & Larson, P.C.

(57) ABSTRACT

The present disclosure relates to a method and system for automatic resolution of user queries by a query resolution system. The query resolution system receives user queries from a plurality of input sources, where the user queries are in a natural language. Further, the query resolution system determines user intent by analysing the user queries. Upon determination of user intent, the query resolution system resolves the user queries dynamically by performing one of providing a response for the user queries by retrieving information from one of a database and external data sources based on the user intent and routing the user queries to a query domain resource for resolving the user queries, where the query domain resources is determined based on the user intent.

12 Claims, 5 Drawing Sheets

(56) References Cited

U.S. PATENT DOCUMENTS

2015/0348549 A1* 12/2015 Giuli .................. G06F 16/3329
            704/235
2017/0154105 A1*  6/2017 Suleman ............. G06F 16/3331

* cited by examiner

METHOD AND SYSTEM FOR AUTOMATIC RESOLUTION OF USER QUERIES

CROSS-REFERENCE TO RELATED APPLICATION

The present application claims priority to Indian Provisional Patent Application No. 4807/CHE/2015 filed Sep. 10, 2015, the entire contents of which are hereby incorporated by reference for all purposes.

TECHNICAL FIELD

The present subject matter is related, in general to query processing, and more particularly, but not exclusively to a method and system for automatic resolution of user queries.

BACKGROUND

In the present scenario, dependency on the software associated systems has increased greatly. This dependency over years has bought the existence of customer support services. Generally, responding to user queries for an issue is a manual intensive task as most of the user interactions are in a natural language such as text or voice which is understood only by humans. For instance, a customer typically makes calls to customer support team for seeking resolution and response towards any issues faced by customers. Also, the customer may send queries or an issue through texts to the customer support team for seeking resolution and response towards their queries. In the existing technique, for both the cases, the user queries are analysed manually by the customer support team for resolving and responding to the customers.

Thus, in the existing technique, analysing the user queries manually is time consuming task for resolving and responding towards the queries. In addition, such manual analysis results in delays and inconsistencies in providing resolution towards the user queries. Also, in cases where a same user query is raised by a customer, the customer support team spends time on resolving such user queries again for which a solution is already provided to some other user before. Further, the manual processes involve high expenditure and may sometimes result in bad customer experiences whenever the customer is made to wait for seeking resolution and responses from the customer support team.

Thus, the existing techniques may not resolve the user queries efficiently and automatically. Thus, there is a need for a system which automates the resolution of user queries in real-time.

SUMMARY

In an embodiment, the present disclosure relates to a method for automatic resolution of user queries. The method comprises receiving user queries from a plurality of input sources. The user queries are in a natural language. The method comprises determining user intent by analysing the user queries and resolving the user queries dynamically by performing one of providing a response for the user queries by retrieving information from one of a database and external data sources based on the user intent and routing the user queries to a query domain resource for resolving the user queries. The query domain resource is determined based on the user intent.

In an embodiment, the present disclosure relates to a query resolution system for automatic resolution of user queries. The query resolution system comprises a processor and a memory communicatively coupled to the processor, wherein the memory stores processor executable instructions, which, on execution, causes the query resolution system to receive user queries from a plurality of input sources. The user queries are in a natural language. The query resolution system determines user intent by analysing the user queries and resolves the user queries dynamically by performing one of providing a response for the user queries by retrieving information from one of a database and external data sources based on the user intent and routing the user queries to a query domain resource for resolving the user queries. The query domain resource is determined based on the user intent.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
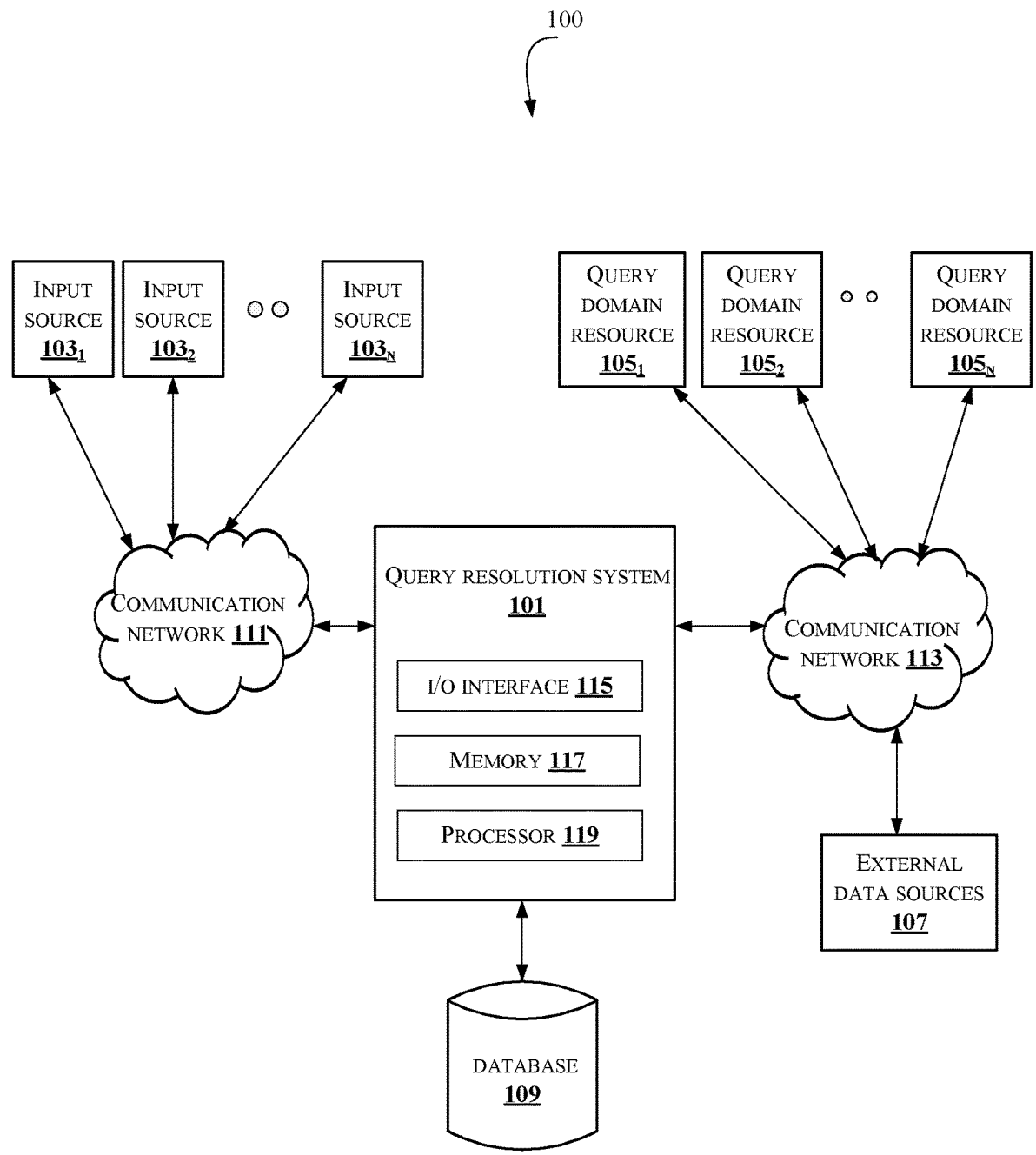
FIG. 1 illustrates an exemplary environment for automatic resolution of user queries in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and system for automatic resolution of user queries. In an embodiment the user queries are in a natural language associated with an issue of a user. In an embodiment, the natural language is a language which is used by humans for communication. The user queries received by the query resolution system are analysed which provides a user intent from the queries. Once the user intent is determined, the user queries are resolved either by retrieving a solution for the received query from one of a database of the query resolution system and external sources or by routing the user queries to query domain resources for resolving and responding to user queries automatically. In an embodiment, the query domain resources are the customer support team or an individual expertise in the domain specific to the received user queries.

FIG. 1 illustrates an exemplary environment for automatic resolution of user queries in accordance with some embodiments of the present disclosure.

As shown in FIG. 1, the environment 100 comprises a query resolution system 101, an input source $103_1$, input source $103_2$, input source $103_N$ (collectively referred as plurality of input sources 103) connected through a communication network 111. The query resolution system 101 is also connected to external sources 107 and a query domain resource $105_1$, query domain resource $105_2$ query domain resource $105_N$ (collectively referred as query domain resources 105) through a communication network 113. Further, the query resolution system 101 is connected to a database 109. The users provide user queries in a natural language using the plurality of input sources 103 for resolution. In an embodiment, the plurality of input sources 103 include, but are not limited to, desktop computers, a Personal Computer (PC), a notebook, a smartphone, a tablet, laptops and any other computing devices. In an embodiment, the user query received from the plurality of input sources 103 may be in the form of emails, chats, social media interactions, Short Message Service (SMS) etc. The database 109 of the query resolution system 101 may comprise solutions and information for resolving the user queries based on the past historical data on similar queries. The query resolution system 101 determines user intent by analysing the user queries. In an embodiment, the analysing of the user queries is done by applying cognitive computing technique. In an embodiment, a cognitive computing technique comprises Natural Language processing techniques, Semantic Analysis and Machine Learning techniques etc. In an embodiment, the user intent comprises at least one of information on entities present in the user queries, information on metadata extracted from the user queries domain specific information associated with the user queries or user emotion information. In an embodiment, the query resolution system 101 may determine a need for ticketing the user queries based on the user intent and assigns a ticket for the user queries based on the need. Further, the query resolution system 101 assigns a priority to the user queries based on the user intent, historical data for similar type of queries and information from media sources. The query resolution system 101 resolves the user queries by retrieving the solutions and information from one of the database 109 in case the solution is already present in the database 109 based on similar query. In another implementation, where the query received is associated with real time data and information, the query resolution system 101 retrieves the solution from external sources 107 such as third party sources like social media channels, banking servers etc. For example, user requesting for information on current bank account balance. In case, the response to user queries cannot be determined from the database 109 and external sources 107, the query resolution system 101 routes the user queries along with the priority to query domain resources 105 for resolving the user queries.

The query resolution system 101 comprises an I/O Interface 115, a memory 117 and a processor 119. The I/O interface 115 is configured to receive the user queries from the plurality of input sources 103. The I/O interface 115 also retrieves information from the database 109 and external sources 107 for resolving the user queries automatically.

The received information from the I/O interface 115 is stored in the memory 117. The memory 117 is communicatively coupled to the processor 119 of the query resolution system 101. The memory 117 also stores processor instructions which cause the processor 119 to execute the instruction in order to automate resolution of user queries.

Figure 2A:
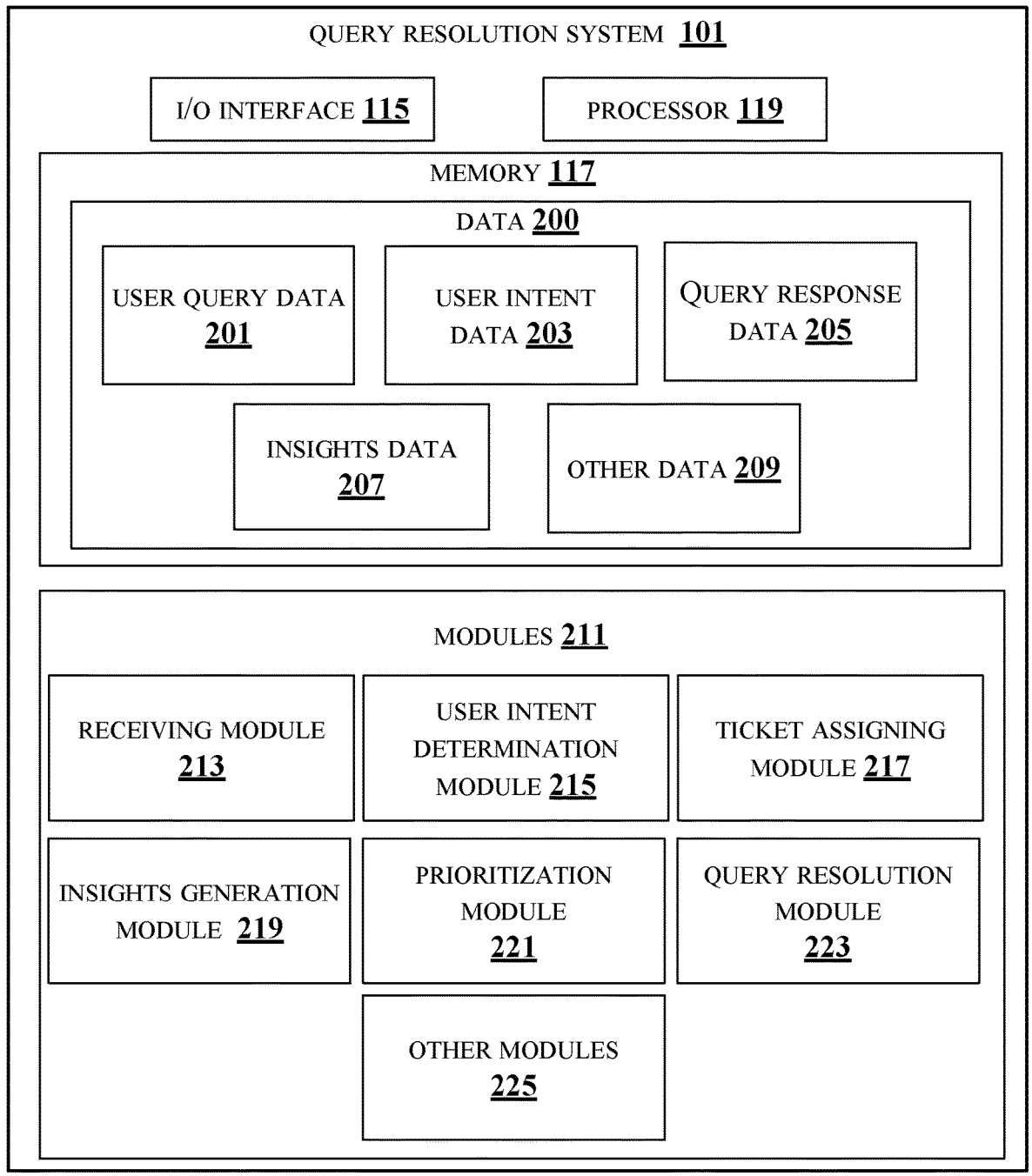
FIG. 2A shows a detailed block diagram illustrating query resolution system in accordance with some embodiments of the present disclosure.

FIG. 2A shows a detailed block diagram illustrating query resolution system in accordance with some embodiments of the present disclosure.

One or more data 200 and one or more modules 211 of the query resolution system 101 are described herein in detail. In an embodiment, the one or more data 200 comprises user query data 201, user intent data 203, query response data 205, insights data 207 and other data 209 for automatic resolution of user queries.

The user query data 201 comprises queries received from the plurality of input sources 103. In an embodiment, the user queries are the user interaction received in the natural language. The user queries are in the form, without limitation, emails, chats, voice calls, social interaction, Short Message, Service etc.

The user intent data 203 comprises at least one of information on entities present in the user queries such as products, services, and places etc., information on metadata extracted from the user queries. In an embodiment, the metadata extraction identifies fixed patterns using regular expressions. The fixed patterns comprise, for example, name value pairs e.g. order number, mobile number, Social Security Number (SSN), dates, currency, amounts etc. Further, the metadata extraction comprises sections of texts which contain metadata such as product names, home or office address etc. Further, the user intent comprises domain specific information associated with the user queries. For example, in the typically banking sectors the domain specific information associated with the user queries may be transfer money, close account, check balance, apply for card etc. The user intent further comprises user emotion information for example, angry, excited, disappointed etc.

The query response data 205 comprises information about the resolution of the user queries received. The resolution is provided automatically either by retrieving from one of database 109 or from external sources 107 such as third party applications. The resolution for user queries are also received from the query domain resources 105 in case the solution for the queries is not determined from the database 109 and external sources 107.

The insights data 207 comprises analysed information which is extracted from a plurality of user queries and corresponding responses. The plurality of user queries and corresponding responses are received over a period of time. The analysed information helps in resolving the user queries based on the intent analytics, location analytics, source analytics, usage analytics, user analytics, emotion analytics and topic analytics. In an embodiment, the insights data 207 allows enterprises to identify root-cause of issues, patterns and trends in the user queries which helps in better and faster resolution.

The other data 209 may store data, including temporary data and temporary files, generated by modules for performing the various functions of the query resolution system 101.

In an embodiment, the one or more data 200 in the memory 117 are processed by the one or more modules 211 of the query resolution system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the one or more modules 211 may include, for example, receiving module 213, user intent determination module 215, ticket assigning module 217, insights generation module 219, prioritization module 221 and query resolution module 223.

The one or more modules 211 may also comprise other modules 225 to perform various miscellaneous functionalities of the query resolution system 101. It will be appreciated that such aforementioned modules may be represented as a single module or a combination of different modules.

The receiving module 213 receives the user queries from the plurality of input sources 103. The user queries are provided by the users in the natural language. Particularly, receiving the user queries involves listening to the user queries. In an embodiment, the user queries are received using connectors and/or crawlers specific to the plurality of input sources 103. Further, the receiving module 213 receives the information if present, from the database 109 and from external sources 107 for resolving the user queries. The information on resolution for such queries are stored in the database 109 based on the past history of queries. The receiving module 213 also receives the response and resolution for the user queries from the query domain resources 105. In such case, the user queries are resolved by routing the user queries to different query domain resources 105 for receiving contextual response towards the user queries.

Figure 2B:
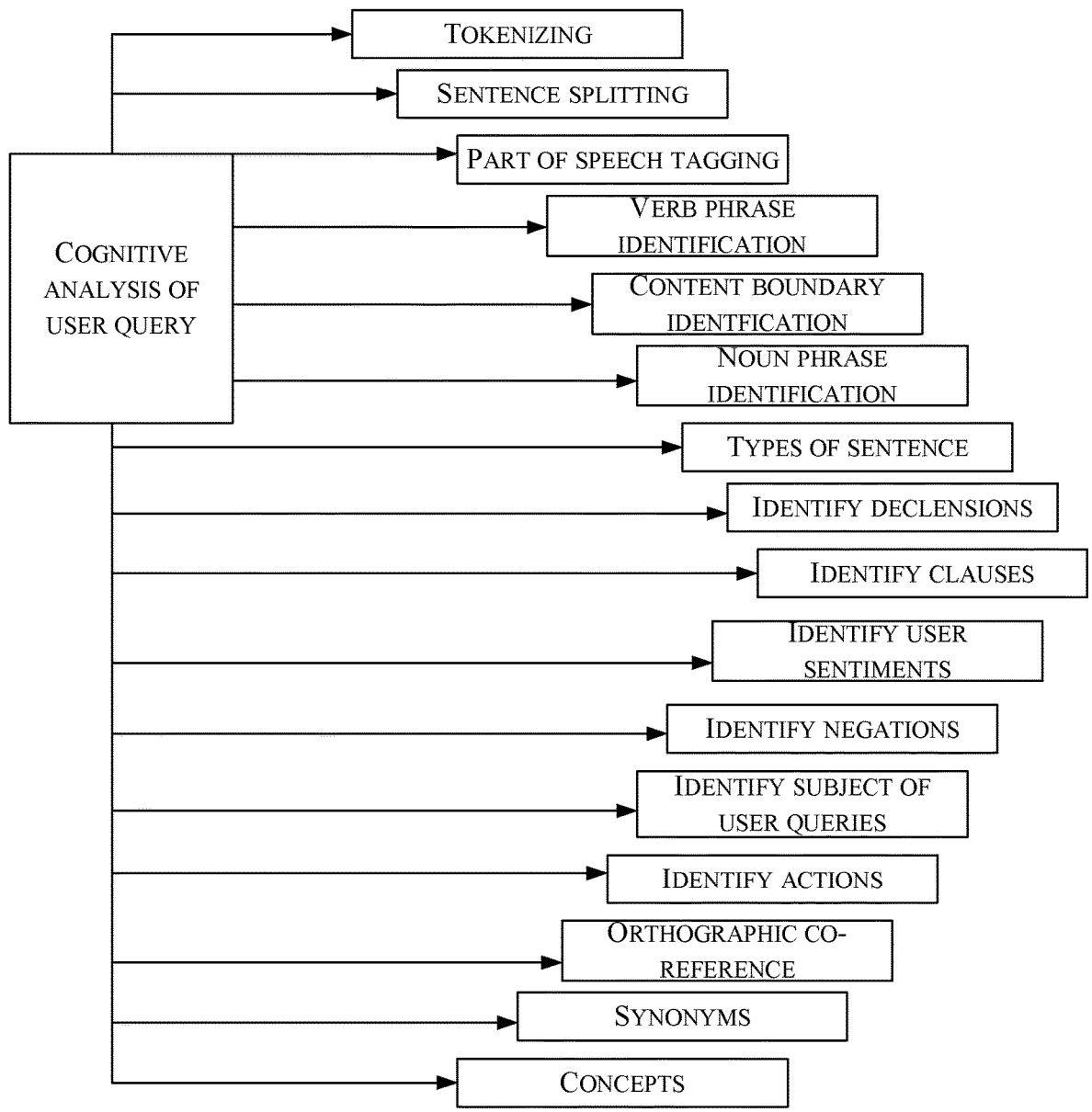
FIG. 2B shows an exemplary representation of cognitive analysis of user query in accordance with some embodiment of the present disclosure.

The user intent determination module 215 determines the user intent by analysing the user queries by using cognitive computing techniques. In an embodiment, the user queries received are cleansed to remove duplicate information, auto generated interactions such as vacation replies, remove spam, automated messages and non-relevant content. In an embodiment, the contents of the user queries are processed using the natural language processing technique. In an embodiment, the user intent determination module 215 corrects the common spelling mistakes and short hands such as 'U' to 'you', 'V' to 'we' etc. The user query analysis is a higher level constructs of language understanding and examining such as opinions, questions, wants, wishes, intents etc. FIG. 2B shows an exemplary representation of cognitive analysis of user query in accordance with some embodiments of the present disclosure. As shown in FIG. 2B, the user intent determination module 215 analyses the user queries by performing, without limitations, tokenizing, sentence splitting, Parts of Speech (POS) tagging, verb phrase identification. Content boundary identification, types of sentences, declensions, clauses, user sentiments, negations, subject of sentences, actions, orthographic co-reference on noun phrases, synonyms and concepts. The tokenizing identifies tokens such as email ids, Uniform Resource Locator (URLs), hashtags etc., which are the basic elements for further text analytics. The sentence splitting involves regular expression based sentence splitter to identify the sentence boundaries in user queries. Particularly, a period is identified as an end of sentence. The Part Of Speech (POS) tagging comprises rules based POS tagger for example, with a lexicon with more than double the entries. The verb phrase identification identifies verb phrases, verb groups, and verb type. The content boundary identification involves identifying of content boundaries such as paragraphs, texts within quotes and list of items. The noun phrase identification marks all noun phrases, proper nouns. The types of sentences involve identification of sentences in the user queries such as request, interrogative, suggestions etc. The declensions identification, for example, is performed using linguistic rules to classify prepositions and other relationship indicators into seven declensions. In such a way, relationships between entities mentioned in a sentence of user queries are identified. The clauses are identified using a proprietary sentence parser. The user sentiments, for example, busy or declined are identified. The negations for example "don't", "not able to" are identified. The subject of sentences is identified using a set of rules that considers pronominal co-reference, pleonastic occurrences, voice, clauses, and declensions. The actions are identified by tagging actions based on the verb groups, and separate actions from auxiliaries, modal auxiliaries, etc. The orthographic co-reference on noun phrases is performed to obtain frequency of noun phrases. In an embodiment, every entity or attribute is referred by multiple words. For example, 'leave' or 'vacation' are synonyms of the entity called 'leave'. Such synonyms are used to identify the attribute or entity that is referred in the text. For example, considering a scenario for a network provider, who is interested in classifying all feedback or complaints received, either by mails or through social media, to various organizational aspects such as 'coverage', 'pricing plans', 'billing issues'. In such a case, texts can be classified such as 'there is no network near my home', 'I see only 2 bars on my phone at my home' as related to coverage. Here, context and requirement, "(network)" coverage is identified using synonymous words such as 'network', 'bar strength'. Such words are not linguistic synonyms, but are 'domain synonyms'. In one implementation, there is abundance of 'indirect reference', when concepts are abstracted. For example, a text such as 'I tried calling xyz, but it did not go through' is still related to coverage, though no word synonymous to coverage is used there. In an embodiment, concept-tag-matrix is implemented to identify the concepts. For example, coverage is an abstract concept that can be identified when smaller concepts are 'strung together'. In one example, the smaller concepts of a 'call', the event of 'happening' (and a negation), when strung together, refer to the concept of "coverage". In such a way, smaller concepts are identified using tags which are domain-independent. Then, a matrix which is very domain-specific is built. The 'smaller' concepts are generic like absence, negation, busy, attitude, behavior while the 'higher' concepts are domain-specific like 'coverage', 'billing process', 'inventory management'. Additionally, some 'concepts' are contextually derived, and some concepts are linked to each other. The interlinked concept matrices are used for opinion mining. In an embodiment, the insights extracted are converted into detailed multi-level insights which allow the enterprises to identify root-cause of issues and patterns and trends in the customer interactions. Based on the user queries analysis, the user intent determination module 215 determines information on entities present in the user queries, information on metadata extracted from the user queries domain specific information associated with the user queries or user emotion information. In an embodiment, the information on entities present in the user queries are identified by generic named entity recognizer. The generic named entity recognizer identifies people, places, services etc. The user intent determination module 215 determines the information on metadata extracted from the user queries by using without limitation technique such as regular expressions to identify fixed patterns in the user queries. The fixed patterns comprise, for example, name value pairs e.g. order number, mobile number, Social Security Number (SSN), dates, currency, amounts etc. In an embodiment, the user intent determination module 215 uses text mining techniques to identify sections of texts which contain metadata e.g. product names, home or office address etc. The user intent determination module 215 further determines the domain specific information and content associated with user queries based on the analysis of the user queries. For example, contents such as coverage, billing process, inventory management etc., refer to a particular domain. Further, the user intent determination module 215 determines information on user emotions and sentiments from the user queries based on the analysis such as angry, disappointed, excited etc.

Returning back to FIG. 2A, the ticket assigning module 217 determines a need for ticketing the user queries based on the user intent determined. Based on the need, the ticket assigning module 217 assigns tickets for the user queries. In an embodiment, each user query is assigned a unique ticket. Based on the assigned ticket, the user queries are referred for a resolution. Also, the ticket is used to determine status of the query and other relevant information. Particularly, the user queries which require ticketing are ticketed to enable tracking of the response. In an embodiment, conversations or user queries are linked together into a single ticket based on ticket need and/or combinations of contents of the conversation like customer, subject etc.

The insights generation module 219 generates the insights by analyzing the user queries received and associated solutions over a period of time. The insights generation module 219 generates insights by performing intent analytics, such as type of domain, emotions of the users, entities etc., for a number of user queries over a duration of time. Further, the insights generation module 219 generates insights based on the location of the users, source from where the query has occurred, kinds of usage by the users, types of the users, emotions etc.

The prioritization module 221 assigns a priority to each of the user queries. In an embodiment, the conversation is assigned a relative priority. The priority is derived based on the user intent. For example, user queries which comprise specific domain queries such as card lost, fraud etc., or user emotions representing negative emotion, sentiment, complaints, suicidal etc., are given more priority against other user queries. Further, the priority is assigned based on the historical data for similar type of queries for example, previous queries stored in the database 109 leading to escalations and information from media source such as media channels. Priority may also be assigned based on information concerning virality of the user queries content, number of followers on social media etc.

The query resolving module 223 resolves the user queries received in the natural language dynamically. The query resolving module 223 resolves the prioritized user queries by providing a response for the user queries by retrieving information associated with the prioritized user queries from one of the database 109 and external sources 107. The information is retrieved from the database 109 based on the availability and occurrences of similar queries in the past. In an embodiment, for retrieving the information from the database 109, the query resolving module 223 converts each of the user queries into an intermediate user query using cognitive computing technique. The intermediate query for each of the user queries comprises the user intents such that the intermediate query can be used to query the database 109 using search techniques or query the structured external sources 107 using application programming interface. In an alternate embodiment, the query resolving module 223 retrieves information from external sources 107 such as third party sources for example, banking servers, social media and any other sources for dynamically retrieving the information on user queries. For example, the user query comprises "what is my account balance". In such cases, where the queries require real time information to be resolved, the query resolving module 223 retrieves the information from external sources 107 dynamically for responding to the users. Upon receiving the response from the external sources 107 and database 109, the query resolution module 223 provides the resolution to the users automatically in real-time. Further, in case the user query is complex and require assistance from a resource, the query resolving module 223 routes the prioritized user queries for resolving to selected query domain resources 105. The query domain resources 105 are determined by the query resolving module 223 based on the user intent information determined earlier and the specific domain knowledge of the query domain resources 105. In an embodiment, the query domain resources 105 may resolve the user queries received based on the priority. In an embodiment, the query domain resources 105 resolves the user queries by performing actions towards the user queries based on their preferences. In another embodiment, the query domain resources 105 may resolve the user queries by providing a solution which is required to be performed by the users in order to resolve the queries.

Figure 3:
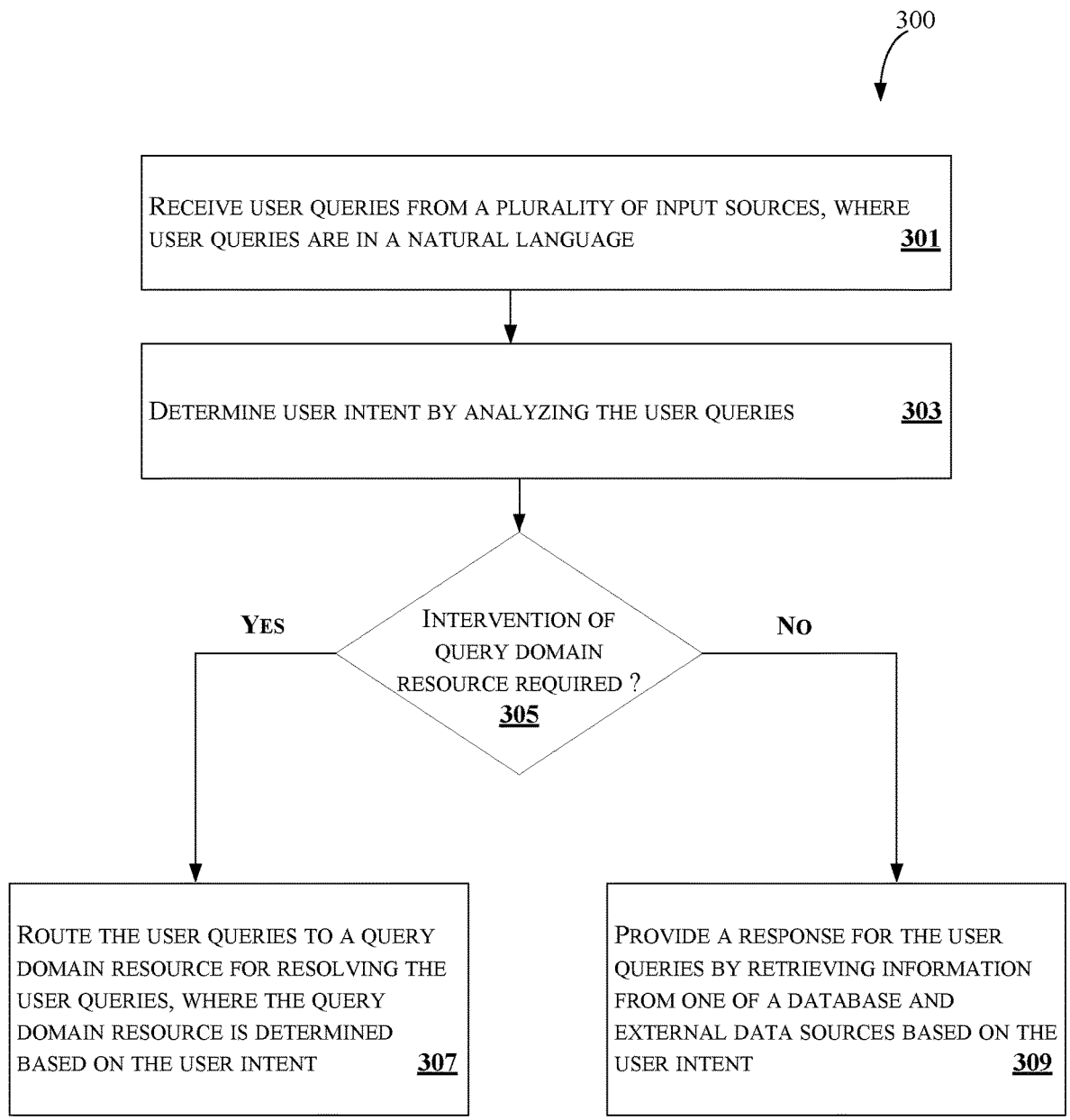
FIG. 3 illustrates a flowchart showing a method for automatic resolution of user queries in accordance with some embodiments of present disclosure.

FIG. 3 illustrates a flowchart showing a method for automatic resolution of user queries in accordance with some embodiments of present disclosure.

As illustrated in FIG. 3, the method 300 comprises one or more blocks for automatic resolution of user queries. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the query resolution system 101 receives the user queries from a plurality of input sources 103, where the user queries are in a natural language.

At block 303, the query resolution system 101 determines the user intent by analysing the user queries. In an embodiment, the user queries are analysed by using cognitive computing technique.

At block 305, the query resolution system 101 checks if a solution for resolving the user queries is available in the database 109. Also, if the user query is related to real-time solutions, the query resolution system 101 checks the resolution information with the external sources 107. In such cases, the method moves to block 307. In another case, if the user queries require expertise resources, the query resolution system 101 routes such user queries to query domain resources 105. The method moves to block 309 in such a case.

At block 307, the query resolution system 101 resolves the user queries by providing a response for the user queries by retrieving information from one of database 109 and external data sources 107 based on the user intent.

At block 309, the query resolution system 101 resolves the user queries by routing the user queries to query domain resources 105, where the query domain resources 105 are determined are based on the user intent.

Computing System

Figure 4:
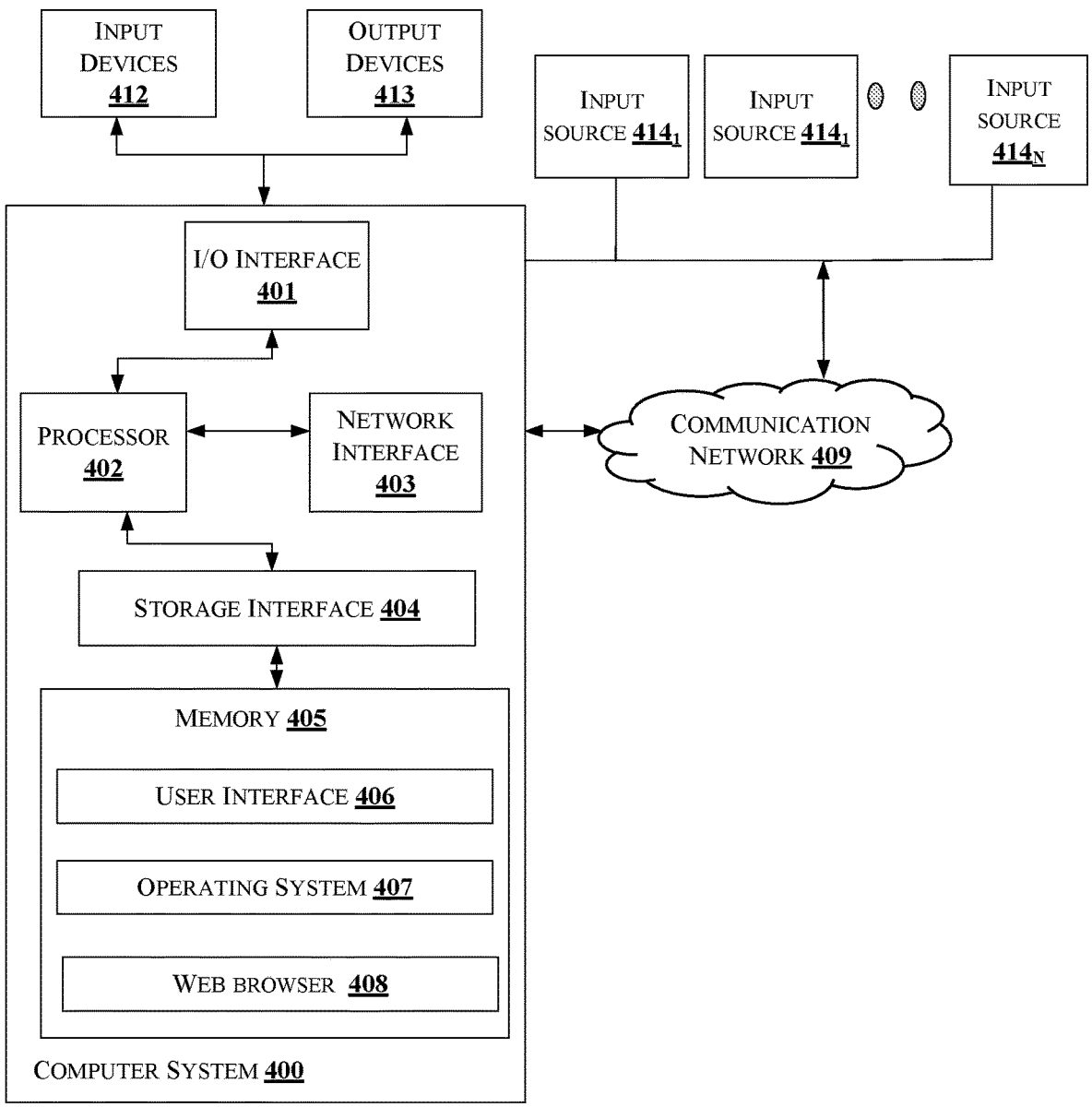
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 is used to implement the query resolution system. The computer system 400 may comprise a central processing unit ("CPU" or "processor") 402. The processor 402 may comprise at least one data processor for automatic resolution of user queries. The processor 402 may include specialized processing units such as integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 400 consists of a query resolution system. The processor 402 may be disposed in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 403 and the communication network 409, the computer system 400 may communicate with the input source 4141, input source 4142 input source 414N. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 409 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 3) via a storage interface 404. The storage interface 404 may connect to memory 405 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407, web browser 408 etc. In some embodiments, computer system 400 may store user/application data 406, such as the data, variables, records, etc. as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 400 may implement a web browser 408 stored program component. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure automates the resolution of the user queries in real-time.

An embodiment of the present disclosure automates routing of the user queries to various departments of the customer support team.

An embodiment of the present disclosure reduces time and cost by automatically redirecting and resolving the user queries. In such a way, response time reduces.

An embodiment of the present disclosure enhances the user experience by responding to user queries automatically.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Query resolution system |
| 103 | Plurality of input sources |
| 105 | Query domain resources |
| 107 | External sources |
| 109 | Database |
| 111 | Communication network |
| 113 | Communication network |
| 115 | I/O interface |
| 117 | Memory |
| 119 | Processor |
| 200 | Data |
| 201 | User query data |
| 203 | User intent data |
| 205 | Query response data |
| 207 | Insights data |
| 209 | Other data |
| 211 | Modules |
| 213 | Receiving module |
| 215 | User intent determination module |
| 217 | Ticket assigning module |
| 219 | Insights generation module |
| 221 | Prioritization module |
| 223 | Query resolving module |
| 225 | Other modules |

The invention claimed is:

1. A method for automatic resolution of user queries, the method comprising:
receiving, by a query resolution system, user queries from a plurality of input sources, wherein the user queries are in a natural language;
determining, by the query resolution system, in real-time, a user intent associated with the user queries, wherein the user intent comprises at least one of information on entities present in the user queries, information on metadata extracted from the user queries, domain specific information associated with the user queries or user emotion information, wherein the user intent is determined by performing sequentially:
tokenization on the user queries to identify one or more tokens;
assembling the one or more tokens to identify one or more sentences;
identifying parts of speech in each of the one or more sentences;
identifying declensions to classify relationship indicators in the one or more sentences;
determining clauses, actions, negation, subject, type of sentences used, status, concepts, synonym details, and indirect references in the one or more sentences; and
performing orthographic co-reference on noun phrases to obtain frequency of noun phrases in the one or more sentences; and
resolving, by the query resolution system, the user queries dynamically by performing one of:
providing, by the query resolution system, a resolution for the user queries by retrieving information from one of a database and external data sources based on the user intent; and
routing, by the query resolution system, the user queries to a query domain resource for resolving the user queries, wherein the query domain resource is an expertise in a domain related to the user queries and is determined based on the user intent.

2. The method as claimed in claim 1, wherein the user queries are analysed by cognitive computing techniques.

3. The method as claimed in claim 1, further comprising determining a need for ticketing the user queries based on the user intent.

4. The method as claimed in claim 3, further comprising assigning a ticket to the user queries based on the need for ticketing.

5. The method as claimed in claim 1, further comprising generating insights information based on a plurality of user queries and corresponding responses received over a period of time.

6. The method as claimed in claim 1, further comprising assigning a priority to the user queries based on the user intent, historical data for similar types of queries and information from media sources.

7. A query resolution system for automatic resolution of user queries, comprising:
a processor; and
a memory communicatively coupled to the processor, wherein the memory stores processor instructions, which, on execution, causes the processor to:
receive user queries from a plurality of input sources, wherein the user queries are in a natural language;
determine in real-time user intent associated with by analysing the user queries, wherein the user intent comprises at least one of, information on entities present in the user queries, information on metadata extracted from the user queries, domain specific information associated with the user queries or user emotion information, wherein the user intent is determined by performing sequentially:
tokenization on the user queries to identify one or more tokens;
assembling the one or more tokens to identify one or more sentences;
identifying parts of speech in each of the one or more sentences;
identifying content boundary based on the one or more sentences;
identifying declensions to classify relationship indicators in the one or more sentences;
determining clauses, actions, negation, subject, type of sentences used, status, concepts, synonym details, and indirect references in the one or more sentences; and
performing orthographic co-reference on noun phrases to obtain frequency of noun phrases in the one or more sentences; and resolve the user queries dynamically by performing one of:
providing a resolution for the user queries by retrieving information from one of a database and external data sources based on the user intent; and
routing the user queries to a query domain resource for resolving the user queries, wherein the query domain resource is an expertise in a domain related to the user queries and is determined based on the user intent.

8. The query resolution system as claimed in claim 7, wherein the processor analyses the user queries by cognitive computing techniques.

9. The query resolution system as claimed in claim 7, wherein the processor further determines a need for ticketing the user queries based on the user intent.

10. The query resolution system as claimed in claim 9, wherein the processor further assigns a ticket to the user queries based on the need for ticketing.

11. The query resolution system as claimed in claim 7, wherein the processor further generates insights information based on a plurality of user queries and corresponding responses received over a period of time.

12. The query resolution system as claimed in claim 7, wherein the processor further assigns a priority to the user queries based on the user intent, historical data for similar types of queries and information from media sources.

* * * * *